Patented Nov. 2, 1948

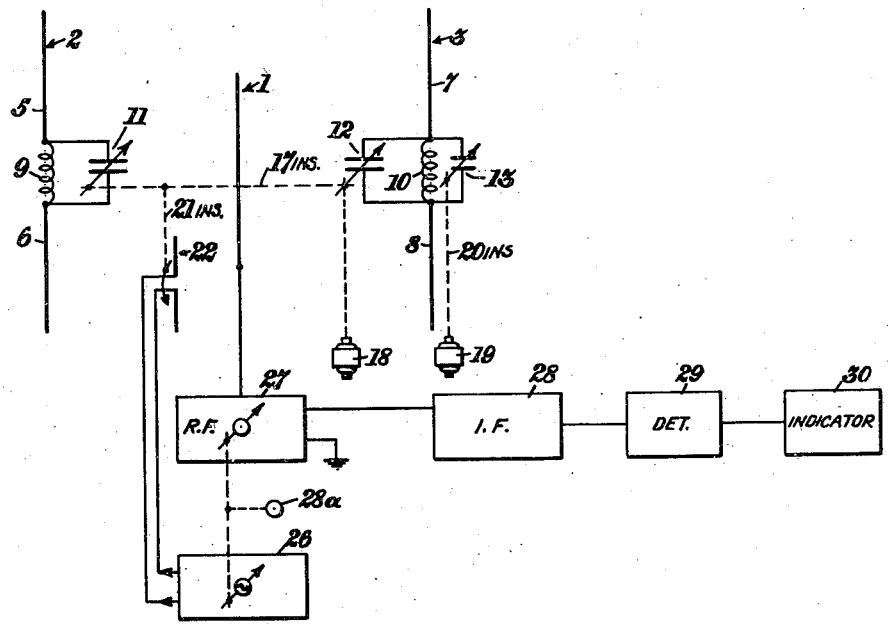
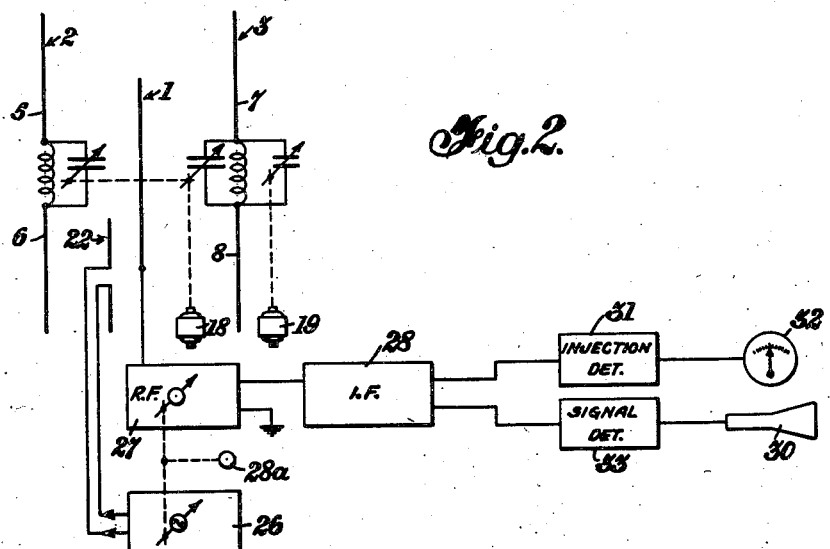

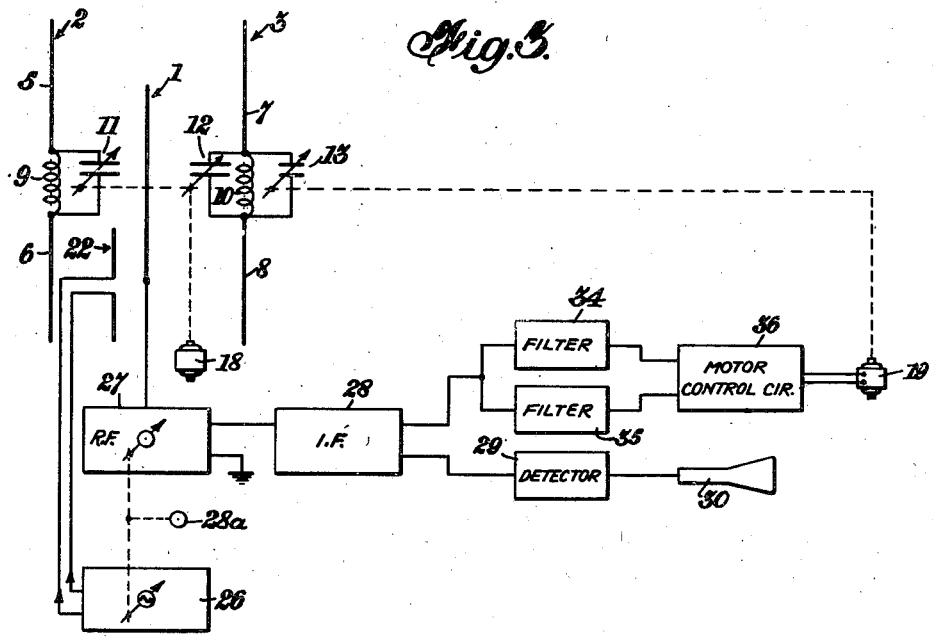
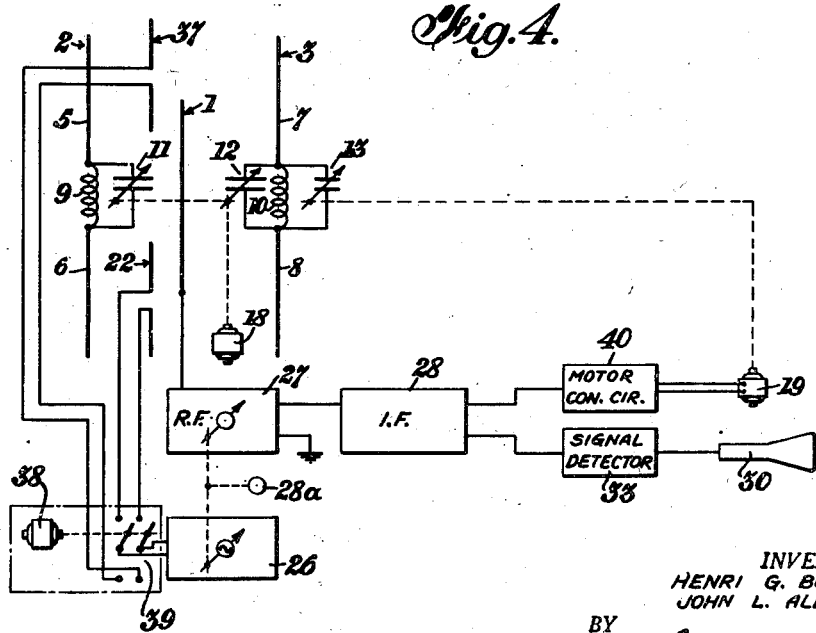

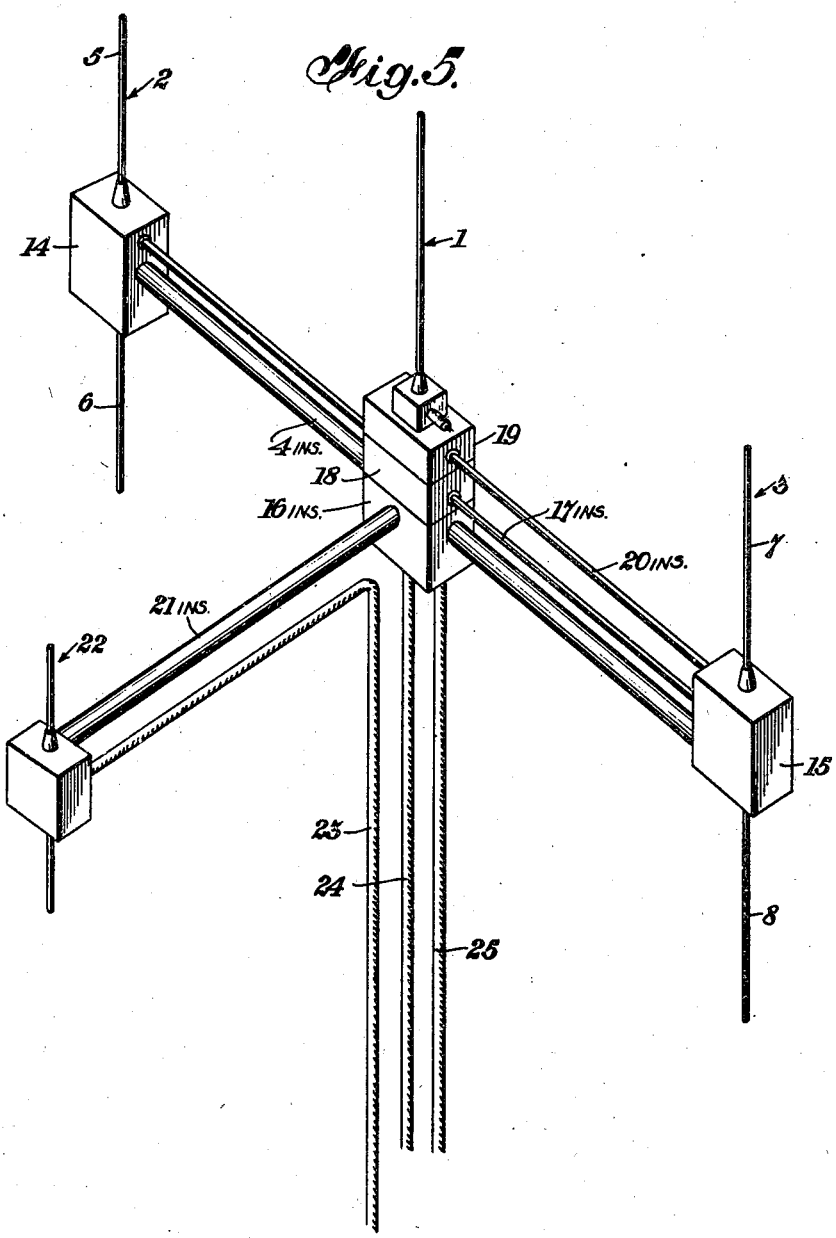

2,452,546

UNITED STATES PATENT OFFICE 2,452,546

DIRECTION FINDER

Henri G. Busignies, Forest Hills, and John L. Allison, New York, N. Y., assignors to Federal Telephone and Radio Corporation, New York, N. Y., a corporation of Delaware Application June 20, 1945, Serial No. 600,478

22 Claims. (Cl. 343—116)

This invention relates to direction-finding or locating systems and more especially to direction-finding systems employing free radiating antennae as part of the direction-finding antenna array.

The invention is in the nature of an improvement on the directional system disclosed in application Serial No. 587,242 filed April 9, 1945. There is disclosed in said application an arrangement for determining the direction of a remote radiating source, by employing a main or direction-finding antenna and a pair of auxiliary dipoles which act as reradiators to the main or central antenna. In one embodiment, the three antennae are in the form of dipoles mounted in parallel or planar array and the free dipoles are arranged to be rotated around the vertical axis of the central or main antenna so as to produce a null indication when the plane of the array is parallel to the wave front from the remote source whose direction is to be determined. Preferably, the two free dipoles are effectively switched into circuit alternately and recurrently as described in said application Serial No. 587,242. In order that a high order of accuracy may be obtained with such systems, it is not only necessary that the reradiating dipoles be free from any horizontal transverse conductors, but it is also important that the auxiliary dipole systems be accurately tracked or tuned with respect to the frequency from the remote source.

Accordingly, it is one of the principal objects of this invention to provide an improved direction finder of the type employing auxiliary antennae which act as free radiators.

Another object is concerned with a direction finder employing a central or main antenna and a pair of auxiliary free radiating and tuned dipoles, in conjunction with novel means for insuring accurate tracking between the tuning of the said dipoles.

A feature of the invention relates to a direction finder antenna array employing a main or central dipole and a pair of spaced auxiliary radiating dipoles all of which are energized by radiation from a remote source whose direction is to be determined, together with a local injection antenna for controlling the tracking or balancing effect of the auxiliary dipoles.

Another feature relates to a direction finder system of the free reradiating dipole type having means for automatically controlling the tuning or tracking of the auxiliary dipoles.

A further feature relates to a direction finder of the kind having a main or central dipole and a pair of auxiliary dipoles which act as reradiators to the central dipole, together with circuit arrangements for providing a continuing check on the accuracy of tuning or tracking of the auxiliary dipoles.

A further feature relates to a direction-finding antenna array having the properties of the elevated H type direction finder antenna but without the undesired polarization effects of the said H type antenna.

A still further feature relates to the novel organization, arrangement and relative location of parts which cooperate to produce an improved direction finder system.

Other features and advantages not particularly set forth, will be apparent from the following descriptions and the appended claims.

In the drawing, which shows certain preferred embodiments,

Fig. 1 is a generalized schematic diagram of a direction finder system embodying features of the invention.

Fig. 2 is a schematic diagram of a modification of Fig. 1.

Fig. 3 is a further modification of Fig. 1.

Fig. 4 is a still further modification of Fig. 1.

Fig. 5 is a perspective view of an antenna unit according to the invention.

Referring to Figs. 1 and 5, there is shown in generalized schematic form a system according to the invention comprising a main or central direction-finding antenna 1 of any well-known construction, and a pair of auxiliary antennae 2 and 3. Preferably, although not necessarily, the main antenna is in the form of a dipole and the auxiliary antennae 2 and 3 are likewise in the form of dipoles. The antennae 2 and 3 are mounted on a suitable insulating cross-piece 4 (Fig. 5), and are preferably in the form of tuned dipoles whose respective arms 5, 6, and 7, 8, are connected by suitable tuning units comprising, for example, inductances 9, 10, and associated tuning condensers 11 and 12. An additional trimmer condenser 13 is provided for one of the dipoles to assure accuracy of tracking between the tuning of the dipoles. As shown in Fig. 5, the tuning units for the two dipoles may be enclosed in suitable housings 14, 15, carried on the ends of the insulator cross-piece 4. The dipole assembly can be supported on any suitable mast or standard (not shown) whose upper end has fastened thereto the insulating block 16 through which the insulator support 4 passes. Thus, by rotating the standard, the plane of the two dipoles 2, 3, can be rotated for direction-finding purposes, the central dipole 1 being mounted so that its Vertical axis forms the axis of rotation of the dipoles 2 and 3.

The rotor members of the tuning condensers 11 and 12 are connected to a common insulating shaft 17 which is adapted to be rotated under control of a remotely controllable electric motor 18 fastened to member 16. An additional small electric motor 19 is mounted on member 16 above motor 18, and turns an insulating shaft 20 which is connected to the movable element of trimmer condenser 13. Also rigidly fastened to member 16, so as to extend perpendicularly with relation to member 4, is an insulating arm 21 which carries at its free end another dipole antenna 22. The dipole 22 is fed with high frequency energy over any well-known high frequency transmission cable 23. Likewise, suitable power cables 24, 25, are provided for the motors 18, 19, respectively. Since the dipoles 2 and 3 are of the free radiating type, that is they are energized solely by radiation from the distant source whose direction is to be determined, no high frequency feed lines are required therefor. It will be understood that the main antenna 1 is fixedly mounted midway between the two auxiliary dipoles 2 and 3, so that the said auxiliary dipoles can be turned as a unit around the vertical axis of the main antenna 1.

Antennae 2 and 3 when energized from the distant source whose direction is to be determined, act as local reradiators to the antenna 1, and they are alternately and recurrently effective under control of suitable switching arrangements as described in said application Serial No. 587,242. Thus antenna 1 is energized directly from the distant source and also by alternate recurrent reradiations from the dipoles 2 and 3. By means of suitable detecting and indicating circuits, the position of antennae 2 and 3 corresponding to a null signal can be determined, thus giving an indication of the direction of the distant source. For a detailed description of suitable detecting and indicating arrangements, reference may be had to said application Serial No. 587,242, filed April 9, 1945.

As pointed out in said prior application, in order that a high order of accuracy may be obtained, it is highly important that the tuning of the two auxiliary dipoles 2 and 3 be accurately tracked for different frequencies corresponding to the frequencies of the sources whose directions are to be determined. This tracking accuracy is obtained in accordance with the present invention by locally energizing the dipoles 2 and 3 under control of the local radiating antenna 22. This latter antenna 22 will, for purposes of description, be referred to as an injection antenna. For this purpose, the injection antenna 22 is supplied locally with high frequency energy from a suitable high frequency oscillator source or generator 26. The main antenna 1 is connected to any suitable direction-finding radio receiver comprising for example the tunable radio frequency amplifier 27, the output of which can be converted to an intermediate frequency signal by means well-known in the superheterodyne art, and the intermediate frequency can be amplified in the intermediate frequency amplifier 28. The amplified intermediate frequency signals are then detected in a suitable detector 29 and applied to a visual, or other indicator 30, which may be a cathode-ray tube indicator as described in said application Serial No. 587,242, filed April 9, 1945.

Prior to taking directional readings on the indicator 30, it is necessary to assure that the antennae 2 and 3 are properly tracked at the frequency of the distant radiating source. For this purpose, the generator 26 is, prior to taking a bearing, tuned to the frequency of the distant source as are the dipoles 2 and 3. If the two dipoles are accurately tuned or tracked, the injection signal from antenna 22 will produce a balance or null indication on device 30. If the null indication is not initially produced, then by appropriate adjustment of trimmer 13, the proper balance or null indication can be obtained. When taking a bearing, in order to distinguish between the direct radiation from the distant source and the injected signal, it is preferable that the said injection signal be chopped or modulated at a distinctive frequency. Consequently, if the injection generator 26 and the radio frequency amplifier 27 are maintained on the same frequency of tuning, the injection signal can be automatically maintained at a higher level than the signal from the distant source whose direction is to be determined. It will be understood of course that it is not necessary that the devices 26 and 27 be tuned to the same frequency, and if desired the source 26 may be tuned to a slightly different frequency from that of the device 27. Preferably, the injection signal from source 26 is not continuous but is chopped at a recurrence frequency of 50 cycles or some other suitable audio frequency rate. If this chopping frequency is sufficiently low, the operator can observe the incoming or main direction-finding signal from the distant source, in the intervals between the chopping of the injection signal. When the two dipoles 2 and 3 have been adjusted under control of the injection signal, to give a sharp null indication on the indicator 30, the system as a whole is immediately ready to take the bearing of the distant source. The tracking of the tuning of the two dipoles can be effected by the common insulator cross shaft 4, which may be made of Bakelite tubing or rod. The motor 18 which controls the main tuning condensers of the dipoles and the motor 19 which controls the trimmer 13 can be remotely controlled. After suitable settings of the shafts 17 and 20, the equipment is in readiness to take a bearing of the distant source. It is not absolutely necessary that the chopping or recurrence frequency of the injected signal be in the audio frequency range. If there are sufficient band widths available, this chopping or recurrence frequency may be above audibility.

Fig. 2 shows in schematic form a system wherein the injection generator 26 and the tunable radio frequency amplifier of the direction-finding receiver are connected to a common tuning control unit 28a so as to maintain the proper frequency relation between the injection generator and the frequency of the main radiations to be amplified in the amplifier 27. The output of amplifier 27 is then converted by means of a suitable frequency converter to intermediate frequency signals which are amplified in the intermediate frequency amplifier 28. By means of suitable detectors, the chopped injection signal can be passed through an appropriate channel 31 to control the tracking indicator 32 while the main signal picked up by the antenna 1 can be passed through channel 33 to control a bearing indicator 30 which may be in the form of head phones or a cathode ray tube indicator as described in said application Serial No. 587,242 filed April 9, 1945.

In the embodiment of Figs. 1 and 2, the adjustment of the trimmer condenser 13 is effective manually, for example by means of a manual remote control of the motor 19. If it is desired to have the tracking entirely automatic, an arrangement such as shown in Fig. 3 can be employed. The components in Fig. 3 which function the same as the corresponding components of Figs. 1 and 2, bear the same designation numerals. In this embodiment, the injection generator 26, instead of generating a single frequency, generates two frequencies F1 and F2. Frequency F1 is slightly above the perfect tracking frequency, and frequency F2 is slightly below the perfect tracking frequency, it being understood that this frequency relation is maintained by the common tuning control 28a. Consequently, the antennae 2 and 3 will be excited from the injection antenna 22 by two different frequencies. If the trimmer 13 is set for perfect tracking, the resultant effect at the central antenna will be an average of both of the frequency excitations. If however the tracking is off in one direction the effect of one frequency e. g., F1, will be greater than that of the other. The intermediate frequency amplifier 28 therefore amplifies the actual direction-finding signal from antenna 1, and the injection frequencies from the auxiliary antennae. By means of suitable detectors, these respective frequencies can be segregated into two channels, one channel passing the main direction-finding signal and the other channel passing the two injection frequencies. Appropriate filters or frequency discriminators 34 and 35 will then be used in this latter channel to separate two injection frequencies which can then be applied to any well-known form of motor control arrangement 36 which in turn controls the direction of rotation of motor 19, and therefore of the trimmer condenser shaft 20. The arrangement 36 is preferably of the phase-sensitive type, so that the direction of rotation of shaft 20 will depend upon the relative strengths of the frequencies F1 and F2 with respect to some normal or base voltage. In other words, when the two dipoles 2 and 3 are perfectly tracked with each other, the resultant voltage applied to arrangement 36 may be of a predetermined base level, or even zero, so that the motor 19 does not turn shaft 20. If the tracking should have an error in one direction, a positive voltage will be developed under control of filter 34 for example, causing the motor 19 to rotate the shaft 20 in such a direction as to restore the trimmer 13 to its proper tracking position. If the tracking error should occur in the opposite direction, the other filter 35 takes control and causes the motor 19 to rotate in the opposite direction to restore the tracking to its proper value. Instead of having the generator 26 generate two separate frequencies, this generator may be a single tunable frequency oscillator which is chopped or modulated at two separate audio-frequency rates corresponding to frequencies F1 and F2. It should be observed that when the generator 26 generates two separate frequencies as above described, it is not necessary to chop or interrupt the injection signal, since the discrimination between the main direction-finding signal and the injection signal can be effected by employing separate beat frequency oscillators for converting the different intermediate frequencies into corresponding separate signal channels.

Instead of using a single injection antenna, two injection antennae may be employed, one mounted as shown in Fig. 5 and the other mounted on an insulating arm similar to arm 21 but extending perpendicular to shaft 4 on the opposite side of block 16 from that to which the arm 21 is connected. Such an arrangement is schematically illustrated in Fig. 4, wherein the two injection antennae are indicated by the numerals 22 and 37. In this arrangement, the two injection antennae are arranged to be switched alternately and recurrently into circuit with the injection generator 26. While the drawing shows a motor 38 and a mechanical reversing switch 39 for this purpose, it will be understood that any well-known type of electronic switch can be employed so as to switch the output of generator 26 alternately between the antennae 22 and 37. When the auxiliary antennae 2 and 3 are perfectly tracked, a steady or zero voltage will appear at the motor control arrangement 40. If on the other hand the antennae 2 and 3 are not perfectly tracked, there will be an unbalanced voltage which can be applied to control the direction of rotation of motor 19. If desired, the injection signal from generator 26 can be either at the same frequency as the tuned frequency of the radio frequency amplifier 27, or it can be at a different frequency so as to avoid modulation of the main direction-finding signal which is applied to the direction-finding indicator 30 as above described.

Instead of using two separate injection antennae, similar results may be obtained by using the single injection antenna 22 and moving it first to one side of the shaft 4 as shown in Fig. 5 and then to the opposite side. With this arrangement, the bearing may be taken first with the tracking error included when the injection antenna is on one side, for example, as shown in Fig. 5, and then taking a bearing with the same antenna moved through an angle of 180° to the opposite side of shaft 4 without changing the tuning of the main direction-finding receiver 27, 29, etc. The error introduced in the direction-finding indication due to lack of tracking can then be determined and the bearing can be corrected by the amount of error which is observed.

While certain particular embodiments of the invention have been disclosed herein, various changes and modifications may be made without departing from the spirit and scope thereof.

What is claimed is:

1. The method of determining the direction of a remote source of wave radiations which comprises, exciting a direction finding antenna by primary radiations from said source and also by auxiliary reradiations from a pair of other tuned antennae adjacent said direction finding antenna and rotatable with respect to said direction finding antenna, controlling the tuning of said pair of antennae by an injection signal local thereto, adjusting the phase relation between said pair of antennae and said direction finding antenna and producing an indication when said pair of antennae bear a certain phase relation with respect to said remote source.

2. The method of determining the direction of a remote source of wave radiations which comprises, exciting a direction finding antenna by reradiation from a pair of other tuned antennas relatively close to said direction finding antenna, said pair of antennas being excited by radiations from said source, injecting a local wave radiation into said pair of antennas to control the tuning thereof, adjusting the phase relation between said pair of antennas and said remote source, and producing an indication when the phases of the said two reradiations are substantially equal.

3. The method according to claim 2 in which the injected radiation is at the same frequency as the frequency of the waves from said source.

4. The method according to claim 2 in which the injected radiation is at a slightly different frequency from that of the waves from said source.

5. In a system of the type wherein a main antenna is excited by primary radiations from a distant source and also by reradiations from a pair of tuned antennae also excited from said source, means to insure proper tuning of said pair of antennae comprising a local antenna in predetermined symmetrical relation to said pair of antennae for injecting a tuning tracking signal into said pair of antennae, and means to adjust the tuning of at least one of said pair of antennae until the effect of said injected signal is substantially equal in both said pair of antennae.

6. In a direction finder system of the type wherein a main antenna is excited by primary radiations from a distant source and also by reradiation from a pair of adjacent tuned antennae, means to tune said pair of antennae, radio receiver means connected to said main antenna and having tuning means, and means to track the tuning of said pair of antennae with the tuning of said receiver, the last-mentioned means including a local high frequency generator, an injection antenna in symmetrical relation to said pair of antennae, and tuning control means responsive to the injected signals in said pair of antennae.

7. A direction-finding arrangement comprising a main wave pick-up, a plurality of tunable auxiliary wave pick-ups, all said pick-ups arranged to be excited by radiations emanating from a distant source whose direction is to be determined, said pick-ups constituting a movable array, said auxiliary pick-ups being coupled to the main pick-up substantially entirely by space induction and reradiation derived from said source, a translating and indicating system coupled to said main pick-up for producing an indication of the angular relation between said array and said source, and means to provide a continuing check on the tuning of said pair of pick-ups, the last-mentioned means including an injection antenna symmetrically mounted with respect to said pair of pick-ups, and means to excite said injection antenna by high frequency waves bearing a definite frequency relation to the wave from said source.

8. A direction-finding arrangement comprising a main direction-finding antenna and a plurality of auxiliary antennae coupled to said main antenna substantially entirely by space induction and reradiation derived from a distant source whose direction is to be determined, said auxiliary antennae effectively reradiating to the said main antennae alternately at a predetermined rate, a translating system connected to said main antenna and including tunable radio receiver means and a device for producing a signal whose amplitude corresponds to the phase difference between the waves acting directly on said main antenna and the waves reradiated thereto by said auxiliary antennae, means to tune said auxiliary antennae, an injection antenna, a tunable excitation source for said injection antenna, means to tune said excitation source and said receiver means, and means responsive to the radiation from said injection antenna to said auxiliary antennae to determine the tuning of said auxiliary antennae.

9. A system according to claim 8 in which the last-mentioned means includes a trimmer condenser for at least one of said auxiliary antennae and means to produce a signal when said trimmer condenser requires adjustment to maintain it properly tracked with the tuning of said receiver means.

10. A direction finder system of the type having a main direction-finding antenna and a plurality of reradiating dipoles movable as a unit around said antenna, means to tune said dipoles, tunable radio receiver means connected to said antenna, an injection antenna symmetrically mounted with respect to said dipoles and movable therewith, a tunable high frequency generator connected to said injection antenna, means connected to said receiver means to separate into two channels the signals picked up by said main antenna from a distant source whose direction is to be determined and the signals reradiated to said main antenna by said dipoles in response to excitation from said injection antenna, and means controlled by the last-mentioned signals to control the tuning means for said dipoles.

11. A direction-finding system according to claim 10 in which the tuning means for said high frequency generator is coupled to the tuning means of said radio receiver to cause said injection antenna to be excited at substantially the same frequency as the frequency of the waves from said distant source.

12. A direction finder system according to claim 10 in which the tuning means of said high frequency generator is coupled to the tuning means of said receiver to cause said injection antenna to be excited at a slightly different frequency from the frequency of the waves from said distant source.

13. A direction finder system according to claim 10 in which the waves from said generator are modulated at a predetermined rate prior to impression on said injection antenna.

14. A direction finder system according to claim 10 in which the waves from said generator are chopped at an audio-frequency rate.

15. A direction finder system according to claim 10 in which the said generator impresses two different frequency waves on said injection antenna.

16. A direction finder system according to claim 10 in which the last-mentioned means includes a trimmer condenser for at least one of said dipoles, a motor for adjusting said trimmer condenser, and a motor control arrangement responsive to said last-mentioned signals for determining the direction and extent of adjustment of said trimmer condenser.

17. A direction finder system according to claim 10 in which said high frequency generator is arranged to generate two frequencies, and said receiver means is provided with filters to produce voltages corresponding to said two frequencies, one of said dipoles having an adjustable tuning element, a motor connected to said tuning element for adjustment thereof, a motor control circuit, and means connecting said filters to said motor control circuit to control the direction and extent of rotation of said motor.

18. A direction finder system according to claim 10 in which each of said dipoles is provided with a main tuning condenser the adjustable elements of which are connected to a common motor by means of insulating cross shafts, one of said dipoles also having an adjustable trimmer condenser, a separate motor for said trimmer condenser, and means to control said separate motor by said last-mentioned signals.

19. A direction finder system of the type having a main direction-finding antenna, and a plurality of free reradiating dipoles movable as a unit around said antenna, means to tune said dipoles, tunable radio receiver means connected to said antenna, an injection antenna, means to mount said injection antenna symmetrically with respect to said dipoles, said injection antenna being arranged for movement from a position between said dipoles and a distant source whose direction is to be determined to a position on the side of said dipoles opposite from said source while maintaining said symmetrical mounting, a tunable high frequency generator connected to said injection antenna, and means to adjust the tuning of at least one of said dipoles until the effect of the injected signals from said injection antenna is substantially equal in both said dipoles.

20. An antenna array for direction-finding systems of the free radiating dipole type comprising a main support, a pair of dipoles insulatingly mounted on said support, motor means carried by said support, insulating shaft means extending from said motor means to corresponding tuning elements of said dipoles, and an injection antenna insulatingly supported from said support means and mounted so as to be symmetrical with respect to said dipoles.

21. An antenna array for direction-finding systems of the type described comprising a main support, insulating shaft means extending transversely of said support and carrying at opposite ends respective free radiating dipoles, a main tuning element for each of said dipoles and connected respectively to said shaft means, a motor carried by said support for rotating said shaft means, a trimmer condenser for at least one of said dipoles, another motor carried by said support and having an insulating shaft connected to said trimmer condenser, and an insulating arm extending from said support perpendicular to said shaft means and carrying at its free end an injection antenna.

22. In a system of the type wherein a main antenna is excited by primary radiations from a distant source and also by reradiation from a plurality of tuned antennas also excited from said source and rotatably positioned with respect to said main antenna, the method of insuring proper phasing of said plurality of tuned antennas with respect to said main antenna comprising exciting said tuned antennas with locally produced radiations from points fixed relative to said tuned antennas, tuning predetermined ones of said tuned antennas to said local radiations and comparing the local radiations reradiated by each of said tuned antennas and received by said main antenna.

HENRI G. BUSIGNIES.
JOHN L. ALLISON.

No references cited.